July 3, 1934.    L. F. NENNINGER    1,965,252
MILLING MACHINE
Filed Aug. 27, 1930    2 Sheets-Sheet 1

LESTER F. NENNINGER
By A. H. Parsons
Attorney

July 3, 1934.  L. F. NENNINGER  1,965,252
MILLING MACHINE
Filed Aug. 27, 1930  2 Sheets-Sheet 2
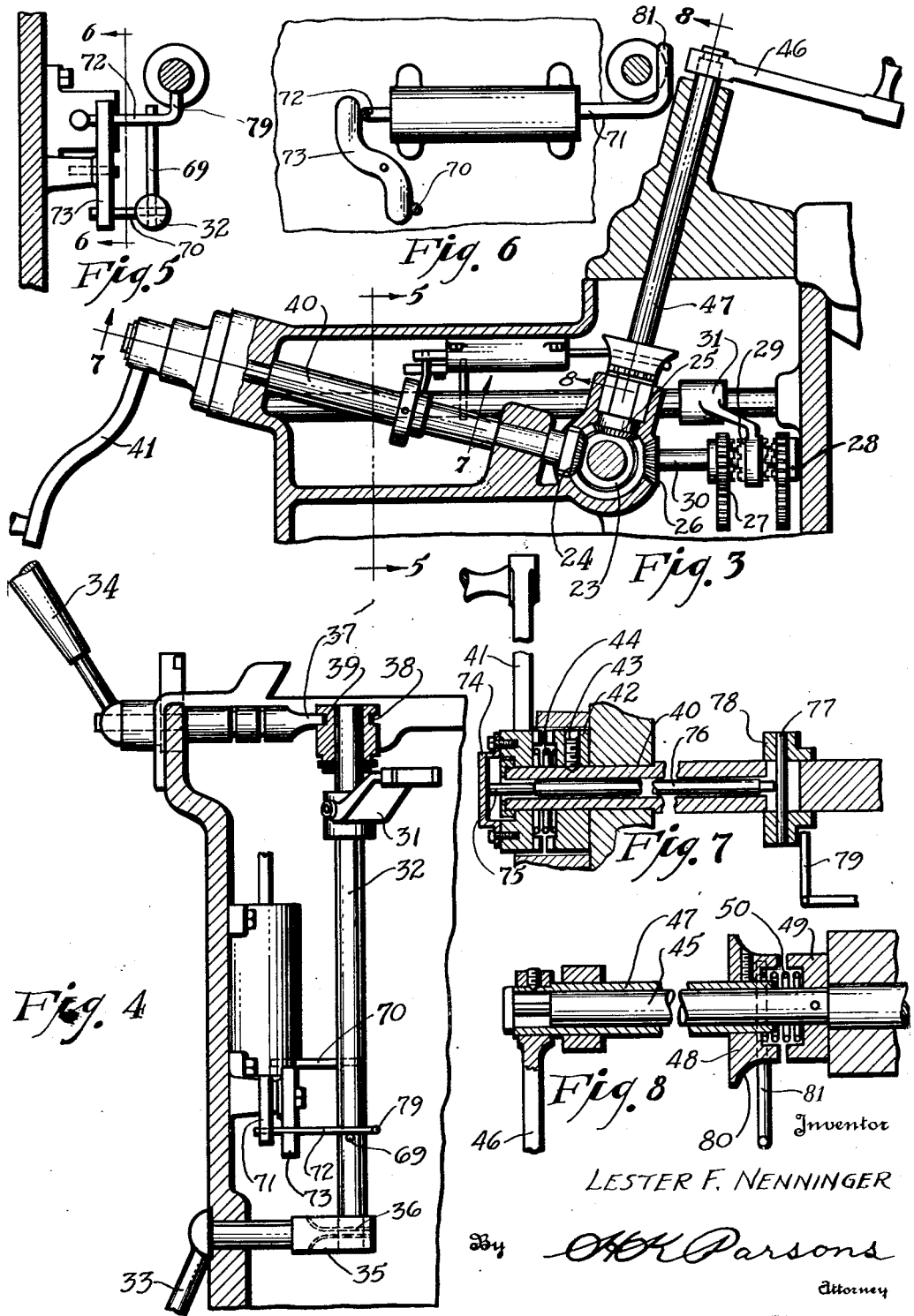
Inventor
LESTER F. NENNINGER
By OHK Parsons
Attorney Patented July 3, 1934

1,965,252

UNITED STATES PATENT OFFICE 1,965,252

MILLING MACHINE

Lester F. Nenninger, Cincinnati, Ohio, assignor to The Cincinnati Milling Machine Company, Cincinnati, Ohio, a corporation of Ohio Application August 27, 1930, Serial No. 478,171

16 Claims. (Cl. 90—20.5)

This invention relates to milling machines and more particularly to clamp control means for the movable elements thereof.

One of the objects of this invention is to provide a clamp for a movable support of a milling machine which is automatically actuable upon disconnection of the motivating force.

Another object of this invention is to provide a power operated clamp for the slide of a milling machine which is automatically released or applied in accordance respectively with the disconnection or the application of power to the impelling means.

A further object of this invention is to provide an automatic clamping mechanism for the knee of a milling machine which is automatically released whenever any of the control levers for raising or lowering the same are moved into operating position.

Other objects and advantages of the present invention should be readily apparent by reference to the following specification considered in conjunction with the accompanying drawings illustrative of one embodiment thereof but it will be understood that any modifications may be made in the specific structural details hereinafter disclosed within the scope of the appended claims without departing from or exceeding the spirit of the invention.

Referring to the drawings in which like reference numerals indicate like parts:

Figure 3 is a sectional plan view illustrating the interconnection between the manual elevating means and the clamp control valve.

Figure 4 is a sectional plan view illustrating the interconnection between the power elevating control means and the clamp control valve.

Figure 5 is a section viewed on the line 5—5 of Figure 3.

Figure 6 is a detail as viewed on the line 6—6 of Figure 5.

Figure 7 is a section on the line 7—7 of Figure 3, and

Figure 8 is a section on the line 8—8 of Figure 3.

Figure 1:
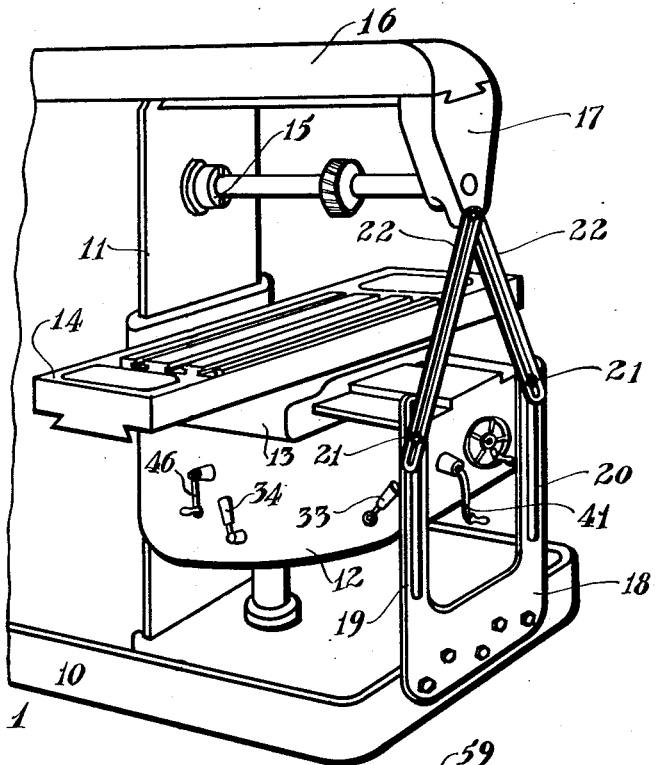
Figure 1 is an elevation of a milling machine embodying the principles of this invention.

Referring to the drawings the reference numeral 10 indicates the standard of a milling machine having guideways 11 formed on a vertical face thereof upon which is mounted for vertical movement a knee 12 which supports a saddle 13 for movement toward and from the standard which in turn has transversely slidable thereon the work table 14. A cutter spindle 15 is journaled in the upper portion of the standard or column for actuating a cutter and an overarm 16 is slidably mounted in the upper portion of the column and provided at the outboard end with a pendant 17 for journaling the outboard end of a cutter arbor driven by the cutter spindle. The parts just described constitute the well known parts of a milling machine and form no part of the present invention.

It has been found desirable in the operation of milling machines and more particularly in the machining of heavy pieces to provide means for rigidly securing the knee in position to minimize vibration of parts, eliminate any tendency for the knee to sag, due to the weight of the work, and insure more accurate machining of the surfaces thereof. One means for accomplishing this object has been illustrated in the drawings and comprises a bracket 18, which may be U-shaped, rigidly secured to the standard 10 and having vertically extending arms 19 and 20. These arms have longitudinal slots formed therein for the reception of clamping bolts 21 by which the knee and bracket are secured together as a unit.

It is conventional practice to provide an outboard brace or support for the overarm of a milling machine and to this end diagonal braces, such as 22, are secured at one end to the pendant and at their lower ends to the knee. This prevents relative vertical movement of the knee with respect to the overarm forming a very rigid structure. In the present instance it has been found convenient to pass the clamping bolts 21 through the arms of the bracket as well as the slotted ends of the braces thereby clamping a brace and an arm to the knee by a single clamping bolt.

In conformity with standard practice the knee of a milling machine is adapted to be vertically adjusted upon its support to vary the distance between the work table and cutter for the purpose of accommodating various sizes and shapes of work and this is accomplished in the present instance by an elevating screw 23 which is rotatably journaled in the knee and threaded in a nut fixed with the base portion of the machine. The elevating screw is provided with a beveled gear fixed therewith which is operatively engaged by beveled gears 24, 25 and 26 for imparting rotation thereto to elevate or depress the knee. The beveled gear 26 is adapted to be rotated by power means, such as the gears 27 and 28, which may be actuated by suitable power means but in opposite directions and a clutch member 29 is interposed between the gears for connecting the one or the other to the shaft 30 which bears the beveled gear 26. A shifter fork 31 attached to the shifter rod 32 engages the clutch member 29 for shifting the same upon actuation of the shifter rod 32 by the operating handles 33 or 34. The handle 33 is located at the forward end of the knee and has a toothed member 35 engaging an indent 36 in shifter rod 32 whereby upon rotation of the handle 33 the shifter rod will be moved back and forth. Similarly, the handle 34 has a projecting finger 37 eccentrically mounted for engaging the groove 38 formed in the collar 39 fixed to the shaft 32. It is thus seen that power operation of the knee may be controlled from the operator's normal position at the front of the table or from his position at the rear of the machine.

Manual operation of the knee elevating mechanism is effected through beveled gear 24 secured to the end of shaft 40 which extends to the front of the machine and is adapted to be rotated by the handle 41 having clutch teeth formed thereon for engaging the clutch teeth of the member 42 secured to the end of the shaft by the set screw 43, as shown in Figure 7. A spring 44 is interposed between the end of handle 41 and the clutch member 42 for normally maintaining the parts in a separated position. Similarly, manual operation of the knee is controlled from the rear of the machine by the gear 25 secured to the shaft 45 and operated by the handle 46. This handle is secured to the end of a sleeve member 47 surrounding the shaft 45, shown more particularly in Figure 8, which has attached or secured to its opposite end the clutch member 48 for engaging, upon longitudinal movement of the sleeve relative to the shaft, the clutch member 49 fixed to the shaft 45. Again, a spring 50 is interposed between the respective clutch members for maintaining the parts normally in a separated position.

Figure 2:
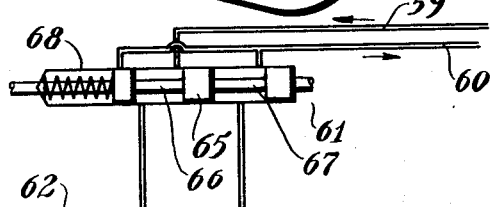
Figure 2 is a diagram of the hydraulic circuit for actuating the clamps.
Figure 2:
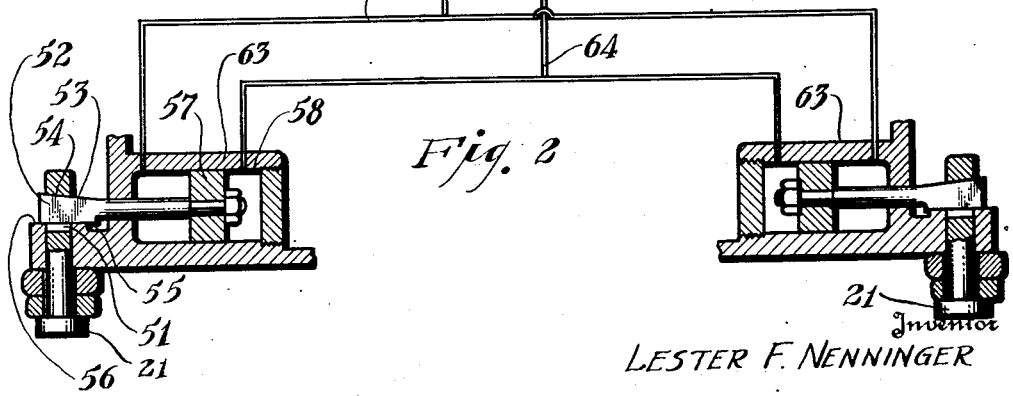

Since it is desirable to have the knee always secured or clamped, except when actually being adjusted, a clamping mechanism has been provided for rigidly securing the knee to a fixed part of the machine in which the parts are normally in a clamped position. The clamping bolts 21 are provided with a longitudinal slot 51, as shown in Figure 2, in which is slidably mounted a wedge member 52 having an inclined face 53 engaging a complementary face 54 of the clamping bolt. The opposite face 55 of the wedge engages the flat surface 56 of a fixed part of the machine and upon longitudinal movement of the wedge reacts against the flat surface to draw the bolt 21 inward by means of the angularly disposed surfaces 53 and 54. To effect reciprocation of the wedge bolt it is provided with a longitudinally extending shank forming a piston rod to the end of which is attached a piston 57 slidably mounted in a cylinder 58 formed in the knee casting.

Hydraulic pressure is provided for actuating the piston and comprises a supply line 59 and a return line 60 which are connected to the control valve 61. A channel 62 leads to the cylinders 58 and 63 and connects with the end of each in such a manner that upon the admission of pressure each wedge bolt will be drawn into clamping position. A second channel 64 is connected to the opposite ends of the cylinders whereby upon the admission of pressure thereto each wedge bolt will be released. A valve member 65 is provided for controlling the flow of pressure and thereby the movement of clamps and has reduced portions 66 and 67 whereby in the position shown the reduced portion 66 will permit the passage of pressure to the line 62 while the other portion 67 will connect the line 64 with the reservoir. A spring 68 is interposed between one end of the valve and the end of its casing to maintain the valve in this position. Upon reciprocation of the valve against the pressure of the spring it will be noted that the flow in the channels 62 and 64 will be reversed thereby releasing both of the clamping bolts. It should now be apparent that in order to automatically release the clamping bolts upon actuation or adjustment of the knee, the valve 65 must be interconnected with the operating members whereby upon actuation thereof the valve member will be shifted against the action of the spring to reverse the flow of the hydraulic medium in the system.

The shifter rod 32 which controls the power actuation of the elevating screw is shown in Figure 4 in a neutral position and to effect engagement of the clutch must be translated from that position either forwardly or rearwardly. To effect release of the clamping bolts upon actuation of the clutch the member 32 is provided with a pair of fixed pins 69 and 70 longitudinally spaced thereon and extending at right angles to one another. The valve member 65 has a projecting plunger rod 71 in the end of which is secured a cross pin 72 which is adapted to be engaged by the pin 69 upon movement of the rod 32 to the rear thereby effecting shifting of the valve and release of the clamping bolts upon engagement of the clutch. The cross pin 72 is also adapted to be engaged by one end of the centrally pivoted lever 73 which has its other end in engagement with the pin 70 when the clutch 29 is in neutral position. Translation of the shifter rod 32 forwardly will thereby cause oscillation of the member 73 again forcing the valve to a bolt releasing position. Since the rod 32 is adapted to be operated from either the front or rear of the machine it is evident that the clamping bolt will be released whenever the knee is elevated or depressed by power means and irrespective of whether it is controlled from the front or rear.

Control of the valve by the manual actuating means for the elevating screw is shown more particularly in Figures 7 and 8. In Figure 7 the handle 41 is provided with a cap 74 having a plunger 75 integrally formed therewith which enters a bore in the shaft 40 in which is reciprocably mounted the plunger rod 76. The rod 76 engages a cross pin 77 secured in the member 78 for shifting the same upon engagement of the handle with the clutch member 42. The member 78 has an annular shoulder for engaging the upturned end 79 of pin 72 secured in the valve stem 71. It is thus seen that engagement of the handle 41 with the clutch member 42 will cause shifting of the valve to release the clamping bolts and this will be true irrespective of the direction of rotation of the handle.

Similarly, the handle 46 upon engagement of the clutch 49 fixed therewith with the clutch 49 will effect reciprocation of the valve by means of a peripheral cam portion 80 formed on the member 48 and engaging the hooked end 81 of the valve stem 71. Although the cam surface 80 is longitudinally tapered it is also circular in cross section and this permits rotation of the shaft and in either direction to either raise or lower the knee without interfering with the proper operation of the valve.

It should now be evident from the structure herein disclosed that clamp means have been provided for rigidly securing a slide of a milling machine to a fixed part thereof together with control means actuated by operation of any of a plurality of means for actuating the slide to effect release of the clamping means and permit adjustment to be made.

That which is claimed is:

1. A milling machine having a column and a knee, means to secure the column to the knee including an hydraulically actuated clamp, a spring closed valve, a source of pressure, manual means for effecting adjustment of the knee upon the column including a clutch member, an operating handle, and means to engage the handle with the clutch to effect operation of the elevating means and simultaneously operate said valve to release the clamp means.

2. A milling machine having a column, a knee slidably mounted thereon for carrying a work support, an overarm attached to the top of the column, a bracket secured to a portion of the column and having a pair of arms engaging an outboard portion of the knee, a pair of overarm braces secured to the outboard end of the overarm and overlapping the ends of the arms on the knee, clamping bolts passing through each arm for clamping a brace therewith, and hydraulically actuated means for effecting clamping thereof.

3. A milling machine having a column, a knee adjustably mounted on the column, an elevating screw therefor, manual means detachably connectible to the screw for actuation thereof, an overarm carried by the column for supporting the outboard end of a cutter arbor journaled in the arm, braces overlappingly secured to the end of the overarm and extending to the knee, hydraulically actuated means for clamping the braces to the knee, and means automatically effective upon connection of said manual means with the elevating screw to release the clamps when the knee is adjusted.

4. A milling machine having a column, a knee slidably mounted on the column, said column having a portion adjacent the forward part of the knee, clamping bolts mounted in said portion for securing the knee against movement relative to said column, cylinders formed in the knee casting, pistons slidably mounted in each cylinder for movement laterally of said bolts, hydraulic means for effecting said movement, and wedge means secured to the end of the pistons for actuation thereby to clamp and unclamp said bolts.

5. A milling machine having a column, a knee slidably mounted on the column, clamping bolts projecting into the knee for securing the knee against movement relative to said column, cylinders formed in the knee casting, pistons slidably mounted in each cylinder for movement laterally of said bolts, hydraulic means for effecting said movement, wedge means secured to the ends of the pistons for actuation thereby to clamp and unclamp said bolts and a control valve for said hydraulic means located in the knee for determining the direction of movement of said pistons and thereby the resultant effect of said bolts.

6. A milling machine having a column, a knee slidably mounted on the column, clamping bolts for securing the knee against movement relative to said column, means to effect clamping of said bolts including a piston and cylinder for each bolt, one of the parts being fixed and the other operatively connected to its respective bolt, hydraulic means for effecting relative movement between the pistons and cylinders, a control valve in the knee for determining the direction of movement of said pistons, said valve having a plunger rod and spring means normally effective on said rod to move the valve to a knee clamping position.

7. A milling machine having a column, a knee movably mounted on the column, manual actuating means at the front and rear of the knee to effect elevation thereof, hydraulic means for clamping the knee to the column, a control valve for the hydraulic means mounted in the knee intermediate the manual means, and connections between each manual means and the valve whereby upon actuation of either manual means the hydraulic means will automatically release the clamp.

8. A milling machine having a column, a knee movably mounted on the column, power means to elevate said knee, including a screw, a pair of reversely driven gears, a clutch interposed between said gears, hydraulic means for clamping the knee including a control valve, a clutch shifter rod extending longitudinally of the knee, means to actuate said shifter rod from the front of the knee, additional means to actuate said shifter rod from the rear of the knee, said shifter rod having a neutral position and axially shiftable power transmitting positions on either side thereof, and mechanism interposed between said shifter rod and valve whereby the valve will be moved to an unclamping position by the shifter rod irrespective of the power transmitting position to which the rod is shifted.

9. A milling machine having a column, a knee mounted on the column, an elevating screw for the knee, rotatable shafts geared to the screw and extending in angularly related directions, manual control levers mounted for free rotation on the ends of the shafts, clutches for coupling the levers to their respective shafts upon axial movement relative thereto, hydraulically actuated means for clamping the knee relative to the column including a control valve, means normally urging the valve to a position to maintain clamping of the parts, means operable upon axial movement of either control lever to shift the valve to an inoperative position, a power driven member, a clutch for coupling the elevating screw thereto for power actuation, dual manual actuators for said clutch located respectively adjacent the manual control levers, additional inter-connecting linkage coupling the clutch actuators to the valve for simultaneous movement to an inoperative position upon engagement of the clutch, and resilient means to disconnect the clutches on the rotatable shafts upon release of the manual control levers by the operator.

10. A milling machine having in combination a column, a cutter spindle journaled therein, a guideway formed on the column, a work support having portions on one side thereof for engaging the column guideways for movement toward and from the cutter spindle, an elevating screw for effecting said movement, hydraulically actuated means on the opposite side of the work support for clamping the same against movement relative to the column and in parallel relation to the cutter spindle, manual means adjacent said two sides of the work support to effect elevation thereof from either position, a control valve for said hydraulically actuated means carried by the work support, and connections between each of said manual means and the control valve to effect movement of the valve to a clamp releasing position upon actuation of either of said manual means.

11. In a machine tool comprising a standard, a tool support and a work support carried by the standard, one of said supports being fixed therewith and the other one movable toward and from the fixed support, the combination of means for translating the movable support comprising a coupled actuator, a plurality of manually operable controls each selectively movable to a position for effecting operation of said actuator, clamping mechanism operable for securing the movable support to the standard, fluid actuable operating means for said mechanism, a source of fluid pressure, valve means having a position for coupling pressure to said fluid actuable means in a manner to lock said clamping means, and means operable upon movement of either of said controls to an operating position to effect shifting of the valve means to a clamp releasing position.

12. In a machine tool having a standard, a work table, a tool support carried by the standard and extending transversely to the direction of movement of the work table, an auxiliary member for supporting the table on the standard, said member being adjustable for varying the spacing between the work table and the tool support, the combination of means for effecting said adjustment including a rotatable member coupled to the auxiliary member, means for effecting rotation of the member selectively connectible therewith, a plurality of clamps operable to secure the auxiliary member with the standard during movement of the work table transversely of the tool support, fluid operable means for said clamps, a source of fluid pressure, a control valve having a position for coupling pressure to said clamp operating means in a manner to clamp the auxiliary member, and means automatically operable upon connection of the rotatable member with its actuating means for shifting the control valve to a clamp releasing position.

13. In a machine tool having a standard, a tool support and a work support carried by the standard, the combination of means for effecting relative movement between the supports including an actuator coupled to one of said supports, a control member shiftable to a position for effecting operation of said actuator, and clamp means for securing the parts after relative adjustment therebetween, including fluid operable means for actuating the clamps, a source of fluid pressure, a control valve, resiliently operable means for maintaining said valve in a position for coupling fluid pressure to said fluid operable means in a manner to lock said clamp means, and means operable upon movement of said control member to an actuator operating position to effect shifting of said control valve against the resistance of said resilient means to a clamp releasing position.

14. In a machine tool having a standard, a tool support and a work support carried by the standard, the combination of means for effecting relative movement between the supports including an actuator coupled to one of said supports, a manually operable control member movable to a position for effecting operation of said actuator, clamp mechanism including fluid operating means for securing the movable support when at rest to the standard, a source of fluid pressure, resiliently operable means normally effective to maintain said clamp means in a locking position, a control valve, and means operable by the control member upon movement to an operating position to effect shifting of the valve to a position coupling the pressure to said fluid operating means in a manner to release said clamping means.

15. In a machine tool comprising a standard, a tool support, an auxiliary support having a work table mounted thereon for movement transversely of the tool support, the combination of means for adjusting said auxiliary support to vary the spacing between the work table and tool support including an actuator coupled to the auxiliary support, power operable means couplable with the actuator, manually operable means for said actuator, a plurality of control levers for operating respectively said power and manual means, clamp mechanism for securing the movable support to said standard, fluid operating means therefor, a source of fluid pressure, a control valve having a first position for coupling pressure to said fluid operating means in a manner to lock said clamp means, and a second position for coupling pressure to said fluid operating means in a manner to release said clamp means, resilient means for normally maintaining said valve in its first position and motion transmitting mechanism between each of said controls and the valve whereby movement of any control to an actuator operating position will effect release of the clamping means.

16. In a machine tool comprising a standard, a tool support and a work support carried by the standard, the combination of means for effecting relative movement between the supports including an actuator coupled to one of said supports, a plurality of controls each selectively movable to a position for effecting operation of said actuator, a plurality of clamping members for securing the movable support to said standard, separate fluid operable means for each clamp including a piston and cylinder, a source of fluid pressure, a control valve, channels coupling one end of each cylinder in parallel to one port of the valve, additional channel means coupling the other end of each cylinder in parallel to a second port of said valve, said valve having a pressure port coupled to the source of pressure, means normally maintaining the valve in a position to couple the pressure port to one end of said cylinders to maintain the clamps in a locking position, and means operable by either of said control members upon movement to an actuator operating position to shift said valve to a position coupling the pressure port to the opposite end of said cylinders to effect release of the clamping means during operation of said actuator.

LESTER F. NENNINGER.